(12) United States Patent
Eshraghi

(10) Patent No.: US 6,898,918 B2
(45) Date of Patent: May 31, 2005

(54) HONEYCOMB RIVET

(75) Inventor: Soheil Eshraghi, Irvine, CA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/358,863

(22) Filed: Feb. 5, 2003

(65) Prior Publication Data

US 2003/0159387 A1 Aug. 28, 2003

Related U.S. Application Data

(60) Provisional application No. 60/359,497, filed on Feb. 25, 2002.

(51) Int. Cl.[7] ................................. E04C 2/54
(52) U.S. Cl. .................... 52/787.1; 52/364; 52/376; 52/377; 52/404.2; 52/406.1; 52/406.2; 52/406.3; 52/483.1; 52/791.1; 52/783.1; 411/34; 411/41; 411/42; 411/43; 411/338; 411/339; 156/73.1; 156/73.5; 156/293
(58) Field of Search ............... 52/787.1, 483.1, 52/791.1, 783.1; 411/43, 338, 339, 34

(56) References Cited

U.S. PATENT DOCUMENTS

| | | | | |
|---|---|---|---|---|
| 3,593,248 A | * | 7/1971 | Shepherd et al. .............. 337/7 |
| 3,771,410 A | * | 11/1973 | Swindt, II .................... 411/338 |
| 3,937,123 A | | 2/1976 | Matuschek et al. |
| 4,012,984 A | | 3/1977 | Matuschek |
| 4,122,753 A | * | 10/1978 | Kuhlmann et al. ............. 411/2 |
| 4,251,916 A | * | 2/1981 | Linden ......................... 30/268 |
| 4,432,679 A | | 2/1984 | Angelosanto et al. |
| 4,436,467 A | * | 3/1984 | Larsson et al. ................ 411/34 |
| 4,490,083 A | * | 12/1984 | Rebish ......................... 411/338 |
| 4,678,384 A | * | 7/1987 | Sparling et al. .............. 411/43 |
| 4,784,551 A | * | 11/1988 | Kendall ......................... 411/43 |
| 4,826,378 A | * | 5/1989 | Pamer et al. ................ 411/338 |
| 4,844,673 A | | 7/1989 | Kendall |
| 4,949,450 A | | 8/1990 | Scharres |
| 5,275,529 A | * | 1/1994 | Langenbrunner et al. ... 415/119 |
| 5,536,344 A | | 7/1996 | van Dreumel |
| 5,658,107 A | * | 8/1997 | Smith .......................... 411/34 |
| 6,077,009 A | * | 6/2000 | Hazelman ..................... 411/43 |
| 6,537,005 B1 | * | 3/2003 | Denham ....................... 411/42 |

OTHER PUBLICATIONS

Cherry Maxibolt blind bolt catalog © 1990 by Textron Aerospace Fasteners, 8 pages.
Cherrymax Rivet (U.S. Appl. No. 4,012,984) catalog © 2000 by Textron Aerospace Fasteners, 31 pages.
Cherrymate Fastening Systems Product Information © 1997 Avdel Cherry Textron Inc., 2 pages.

* cited by examiner

Primary Examiner—Carl D. Friedman
Assistant Examiner—Christy M. Green
(74) Attorney, Agent, or Firm—Trexler, Bushnell, Giangiorgi, Blackstone & Marr, Ltd.

(57) ABSTRACT

The invention provides a rivet and method of installing the rivet to attach honeycomb material to other materials. The rivet is installed by drilling a hole through the materials. A back side sleeve of the rivet is inserted through one end of the hole while a front side sleeve with a stem member inserted therethrough is inserted through the other end of the hole such that the head of the stem member and the sleeve portion of the front sleeve are positioned within the sleeve portion of the back sleeve. The shank portion of the stem member is then pulled such that the head of the stem member expands the sleeve portions of the front and back sleeves into the materials to attach the rivet to the materials. A locking collar is also provided to lock the stem member to the front sleeve upon continued pulling of the stem member.

20 Claims, 5 Drawing Sheets

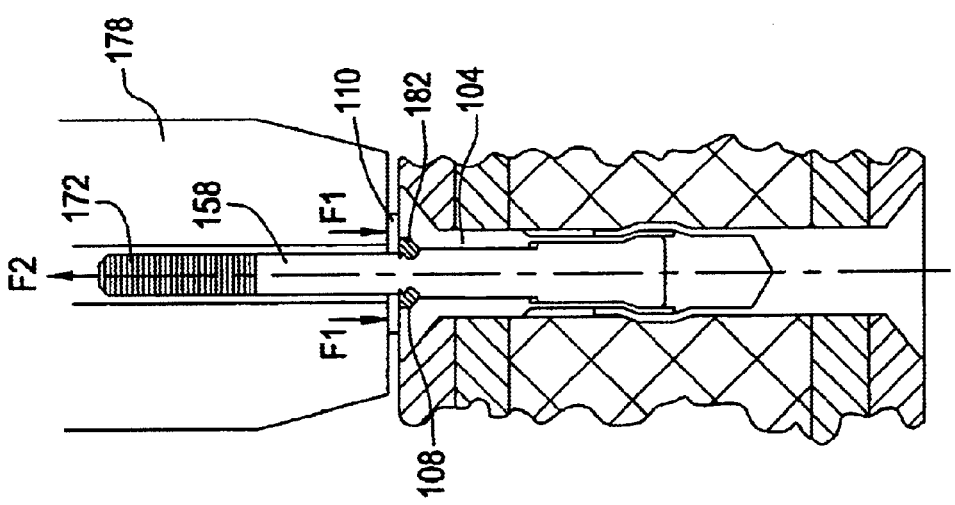
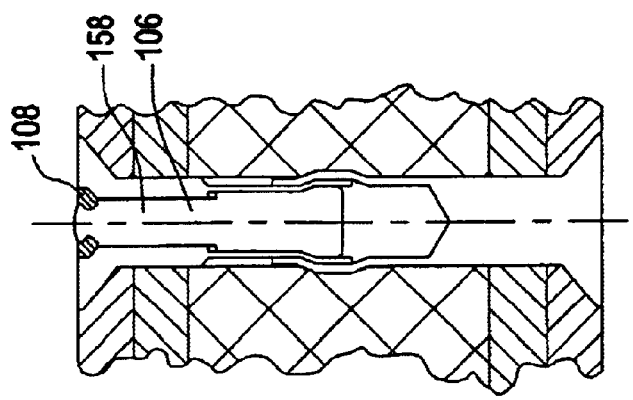

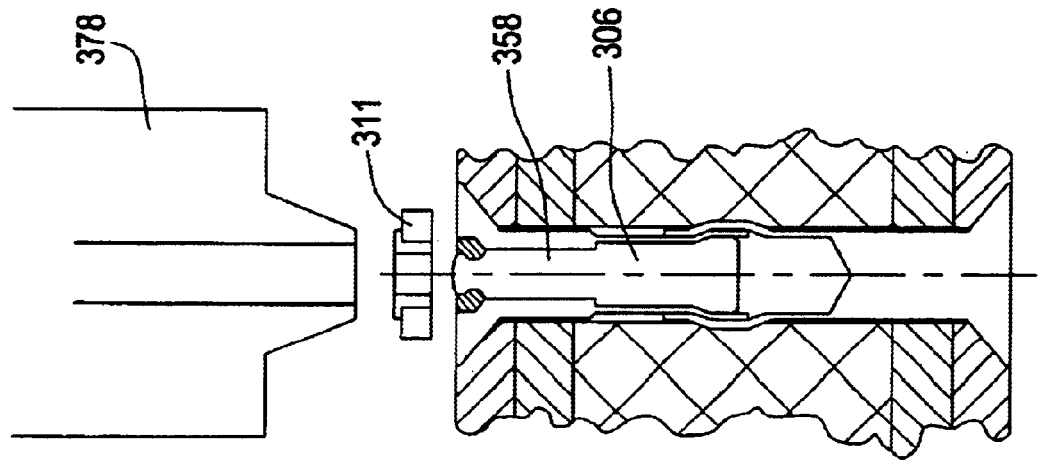
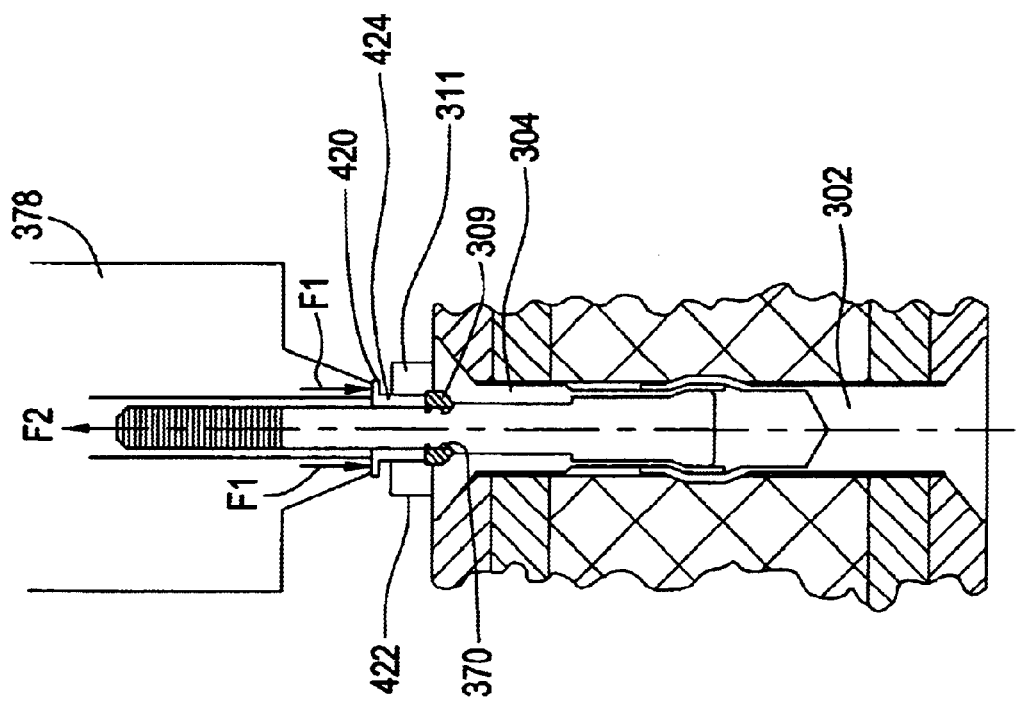

HONEYCOMB RIVET

CROSS-REFERENCE

This patent application claims the benefit of domestic priority of U.S. Provisional Application Ser. No. 60/359,497, filed Feb. 25, 2002, and entitled "Honeycomb Rivet".

BACKGROUND OF THE INVENTION

The present invention relates to a fastener for fastening honeycomb materials to other structures without damage to the honeycomb itself.

Honeycomb materials are used extensively within the aircraft construction business and are attached to other materials, such as sheets of metal, to hold the structure of the aircraft together. Presently there are only a few fasteners which are designed for attaching honeycomb materials to other materials to hold the structure of the aircraft together. A number of disadvantages, though, have arisen in the use of these fasteners. For instance, these fasteners are very expansive and cumbersome to install, thus requiring a lengthy installation process.

Thus, there is a need for a fastener for attaching honeycomb materials to other materials to hold the structure of an aircraft together which overcomes the disadvantages of the prior art fastener designs. The present invention provides for such a fastener design.

OBJECTS AND SUMMARY OF THE INVENTION

A primary object of the invention is to provide a rivet for fastening honeycomb materials to other materials which is quick and easy to install in comparison to other fasteners currently used for the same purpose.

Another object of the invention is to provide a honeycomb rivet which is reliable in attaching honeycomb materials to other materials.

Another object of the invention is to provide a honeycomb rivet which is capable of attaching honeycomb materials to other structures without damage to the honeycomb itself.

Yet another object of the invention is to provide a honeycomb rivet which can be used in large thicknesses of materials.

Still another object of the invention is to provide a honeycomb rivet which clamps tightly and securely without crushing the honeycomb materials or the structures which the honeycomb materials attach to.

Another object of the invention is to provide a honeycomb rivet which only needs a single uniform size hole to be drilled through the honeycomb material and the structures to be attached thereto, for the honeycomb rivet to effectively attach the honeycomb material to the structures.

Still another object of the invention is to provide a hole for the honeycomb rivet to be inserted into which is not tight, thus allowing easy insertion of the honeycomb rivet within the hole prior to the attachment of the honeycomb rivet to the honeycomb materials and the structures to be attached thereto.

Briefly, and in accordance with the foregoing, the invention provides a honeycomb rivet and method of installing the honeycomb rivet to attach honeycomb material to a desired structure. A rivet is installed by drilling a hole through the materials. A back side sleeve of the rivet is inserted through one end of the hole while a front side sleeve with a stem member inserted therethrough is inserted through the other end of the hole such that the head of the stem member and the sleeve portion of the front sleeve are positioned within the sleeve portion of the back sleeve. The shank portion of the stem member is then pulled such that the head of the stem member expands the sleeve portions of the front and back sleeves into the materials to attach the rivet to the materials. A locking collar is also provided to lock the stem member to the front sleeve upon continued pulling of the stem member.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIGS. 4–7 are cross-sectional views of a first embodiment of a honeycomb rivet of the present invention illustrating the attachment of the honeycomb rivet to a workpiece; and FIGS. 8–11 are cross-sectional views of a second embodiment of the honeycomb rivet of the present invention illustrating the attachment of the honeycomb rivet to a workpiece.

DETAILED DESCRIPTION OF THE ILLUSTRATED EMBODIMENT

Figure 1:
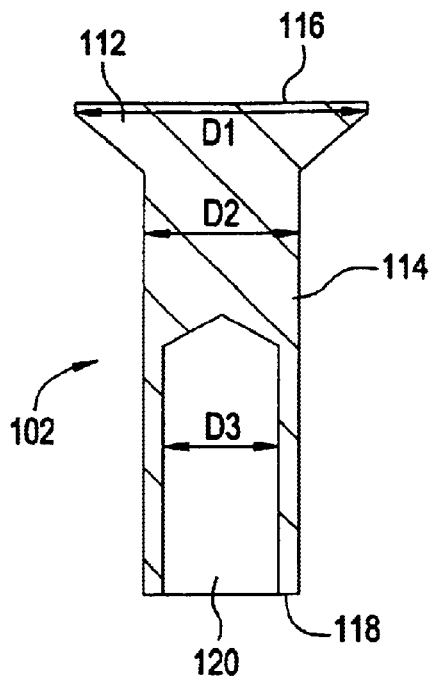
FIG. 1 is a cross-sectional, side-elevational view of a back side sleeve of a honeycomb rivet of both a first and second embodiments of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

A first embodiment of a honeycomb rivet 100 is shown in FIGS. 1–7 and a second embodiment of the honeycomb rivet 300 is shown in FIGS. 8–11. Like elements are denoted with like reference numerals with the first embodiment being in the one and two hundreds, and the second embodiment being in the three and four hundreds.

Attention is now directed to the honeycomb rivet 100 of the first embodiment of the invention as illustrated in FIGS. 1–7. The honeycomb rivet 100 of the first embodiment includes a back side sleeve 102, a front side sleeve 104, a stem member 106, an internal locking collar 108, and a driving anvil 110.

As best illustrated in FIG. 1, the back side sleeve 102 of the honeycomb rivet 100 has a head portion 112 and a sleeve portion 114. The head portion 112 is positioned at a first end 116 of the back side sleeve 102 and the sleeve portion 114 extends from the head portion 112 of the back side sleeve 102 to a second end 118 of the back side sleeve 102. The head portion 112 at the first end 116 of the back side sleeve 102 has an outer diameter D1. From the first end 116 of the back side sleeve 102, the head portion 112 tapers inwardly to the sleeve portion 114. The sleeve portion 114 has a uniform outer diameter D2, which is smaller than the diameter D1.

The sleeve portion 114 has an aperture 120 therein which extends from the second end 118 of the back side sleeve 102 toward the first end 116 of the back side sleeve 102, but does not extend the entire length of the sleeve portion 114. The aperture 120 within the sleeve portion 114 has a diameter D3, which is smaller than the diameter D2.

Figure 2:
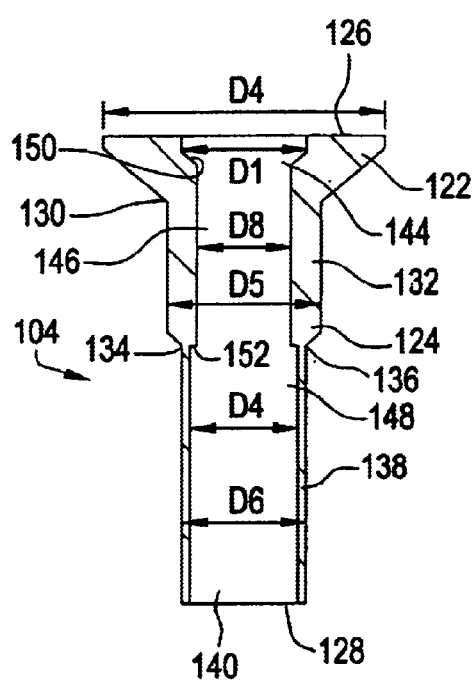
FIG. 2 is a cross-sectional, side-elevational view of a front side sleeve of the honeycomb rivet of both the first and second embodiments.

As best illustrated in FIG. 2, the front side sleeve 104 of the honeycomb rivet 100 has a head portion 122 and a sleeve portion 124. The head portion 122 is positioned at a first end 126 of the front side sleeve 104 and the sleeve portion 124 extends from the head portion 122 of the front side sleeve 104 to a second end 128 of the front side sleeve 104. The head portion 122 at the first end 126 of the front side sleeve 104 has an outer diameter D4. Outer diameter D4 is preferably equivalent to outer diameter D1. From the first end 126 of the front side sleeve 104, the head portion 122 tapers inwardly to a first end 130 of a first portion 132 of the sleeve portion 124. The first portion 132 of the sleeve portion 124 has an outer diameter D5. Outer diameter D5 is preferably equivalent to outer diameter D2 and is smaller than diameter D4. A second end 134 of the first portion 132 of the sleeve portion 124 tapers inwardly to a first end 136 of a second portion 138 of the sleeve portion 124. The second portion 138 of the sleeve portion 124 has an outer diameter D6. Outer diameter D6 is preferably slightly smaller than diameter D3. The purpose of this configuration of the front side sleeve 104 will be discussed further herein.

The front side sleeve 104 has an aperture 140 extending therethrough which extends from the second end 128 of the front side sleeve 104, which is also a second end 142 of the second portion 138 of the sleeve portion 124, to the first end 126 of the front side sleeve 104. The aperture 140 has a first portion 144, a second portion 146 and a third portion 148. The first portion 144 of the aperture 140 is positioned at the first end 126 of the front side sleeve 104 and has a diameter D7. The first portion 144 of the aperture 140 extends within the head portion 122 of the front side sleeve 104. Proximate to the first end 126 of the front side sleeve 104, a wall 150 of the aperture 140 of the first portion 144 tapers inwardly to the second portion 146 of the aperture 140. The second portion 146 of the aperture 140 has a diameter D8. Diameter D8 is smaller than diameter D7. The second portion 146 of the aperture 140 extends from within the head portion 122 of the front side sleeve 104 to the second end 134 of the first portion 132 of the sleeve portion 124. The third portion 148 of the aperture 140 extends the entire length of the second portion 138 of the sleeve portion 124 and has a diameter D9, which is larger than diameter D8. As diameter D9 is larger than diameter D8, an aperture shoulder 152 is provided within the aperture 140 between the second and third portions 146, 148 of the aperture 140.

Figure 3:
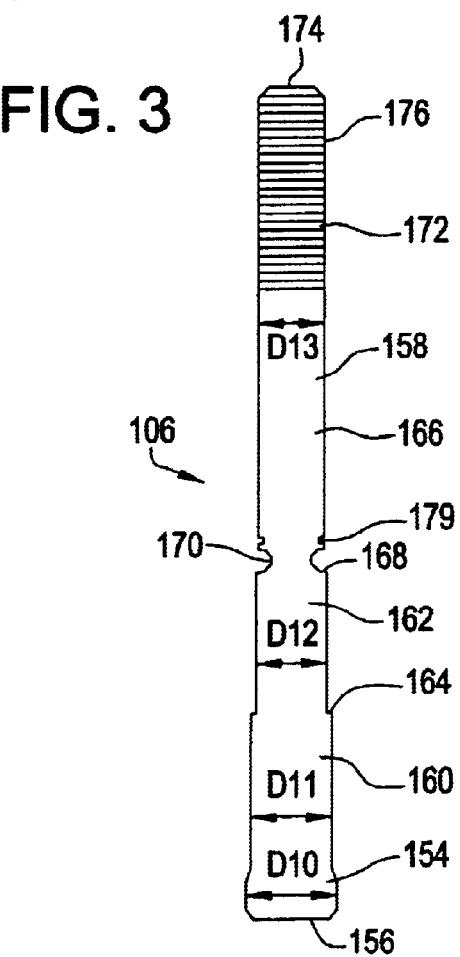
FIG. 3 is a side-elevational view of an elongated stem of the honeycomb rivet of both the first and second embodiments.

As best illustrated in FIG. 3, the stem member 106 includes an enlarged stem head 154 at a first end 156 of the stem member 106 and an elongated shank 158 extending therefrom. The enlarged stem head 154 has a diameter D10 which is slightly smaller than the diameter D3 of the aperture 120 of the back side sleeve 102. The enlarged stem head 154 tapers inwardly to a first portion 160 of the elongated shank 158 which has a diameter D11, which is smaller than the diameter D10 and slightly smaller than the diameter D9 of the aperture 140 at the third portion 148 of the front side sleeve 104.

A second portion 162 of the elongated shank 158 extends from the first portion 160 of the elongated shank 158. The second portion 162 has a diameter D12 which is smaller than the diameter D11, such that a shoulder 164 is provided between the first and second portions 160, 162 of the elongated shank 158. The diameter D12 is slightly smaller than the diameter D8 of the aperture 140 at the second portion 146 of the front side sleeve 104.

A third portion 166 of the elongated shank 158 extends from the second portion 162 of the elongated shank 158. The third portion 166 has a diameter D13 which is smaller than the diameter D12, such that a shoulder 168 is provided between the second and third portions 162, 166 of the elongated shank 158.

The third portion 166 of the elongated shank 158 has an annular lock groove 170 formed therein proximate to the shoulder 168 and the second portion 162 of the elongated shank 158. The third portion 166 of the elongated shank 158 also has a pulling portion 172 proximate to a second end 174 of the stem member 106 and distal to the shoulder 168 and the second portion 162 of the elongated shank 158. The third portion 166 is provided with a plurality of annular pull grooves 176 so that it can be gripped by a conventional pull type or setting tool 178. Such tools are well known in the art and, therefore, the details thereof have been omitted for purposes of brevity and simplicity. The third portion 166 further includes a break notch 179 between the annular lock groove 170 and the pulling portion 172, but proximate to the annular lock groove 170.

Figure 4:
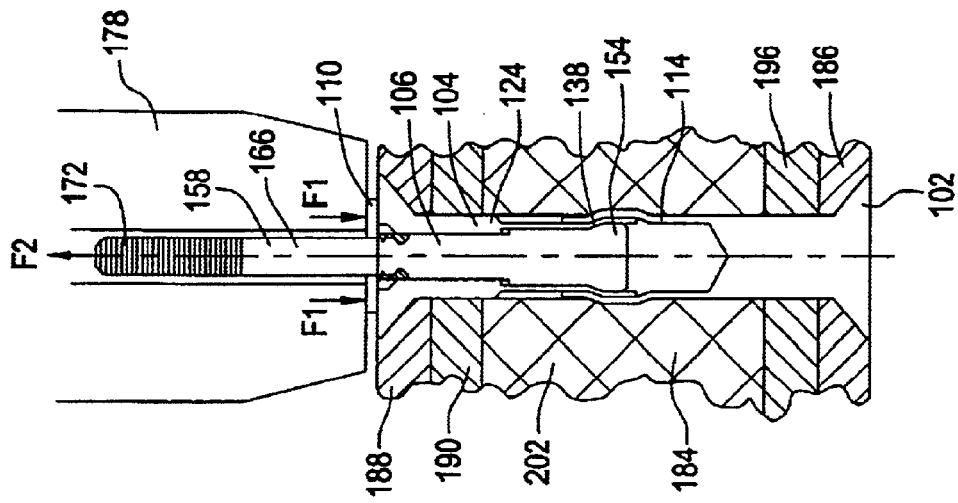

As best illustrated in FIG. 4, the internal locking collar 108 has a locking boss 180 of increased thickness which fits into the annular lock groove 170. A reduced thickness lock sleeve portion 182 of the internal locking collar 108 extends toward the second end 174 of the stem member 106 along the third portion 166 of the elongated stem shank 158. The internal locking collar 108 is of a uniform cylindrical configuration such that the third portion 166 of the elongated stem shank 158 with the internal locking collar 108 positioned thereon has a diameter which is preferably the same size as diameter D12 of the second portion 162 of the elongated stem shank 158. The internal locking collar 108 is preferably formed of a cold deformable material such as precipitation-hardening stainless steel, for instance A-286, or alloys containing nickel, chromium and iron, better known as INCONEL®—manufactured by Inco Alloys International, Inc.

As best illustrated in FIG. 4, the driving anvil 110 is disc-like and has an inner diameter which is slightly larger than diameter D13 of the third portion 166 of the elongated shank 158.

The honeycomb rivet 100 is utlized to attach honeycomb material 184 to at least a first workpiece 186 and, as described herein, between first and second workpieces 186, 188. The honeycomb material 184 includes a first honeycomb skin 190 having inner and outer surfaces 192, 194, a second honeycomb skin 196 having inner and outer surfaces 198, 200 and a honeycomb interior 202 which is provided between the inner surface 192 of the first honeycomb skin 190 and the outer surface 200 of the second honeycomb skin 196. The first workpiece 186, such as a frame for an aircraft, has inner and outer surfaces 204, 206 and is positioned against the second skin 196 of the honeycomb material 184 such that the inner surface 198 of the second skin 196 is positioned against the outer surface 206 of the first workpiece 186. The second workpiece 188, such as an exterior panel for an aircraft, has inner and outer surfaces 208, 210 and is positioned against the first skin 190 of the honeycomb material 184 such that the outer surface 194 of the first skin 190 is positioned against the inner surface 208 of the second workpiece 188. The honeycomb material 184 is preferably formed of either aluminum or titanium.

An operation of utilizing the honeycomb rivet 100 to attach the honeycomb material 184 between the first and second workpieces 186, 188 will now be discussed with relation to FIGS. 4–7.

A hole 212 of uniform diameter is drilled through the first workpiece 186, the honeycomb material 184 and the second workpiece 188, which uniform diameter is slightly larger than the diameter D2 of the sleeve portion 114 of the back side sleeve 102 and the diameter D6 of the second portion 138 of the sleeve portion 124 of the front side sleeve 104. Counterbores 214, 216 are also formed in the hole 212 in both the first and second workpieces 186, 188, respectively. Counterbore 216 is of a size to accommodate the head portion 122 of the front side sleeve 104 while counterbore 214 is of a size to accommodate the head portion 112 of the back side sleeve 102. The drilling of the uniform diameter hole 212 provides for a time saving as it avoids the need for changing of drill bit sizes to drill different size holes, as done in the prior art, or for the need for more than one tool.

After the hole 212 and counterbores 214, 216 are formed within the honeycomb material 184 and the workpieces 186, 188, the honeycomb rivet 100 is positioned within the hole 212 and the counterbores 214, 216.

The back side sleeve 102 is positioned within the hole 212 by inserting the sleeve portion 114 thereof into the hole 212 through the first workpiece 186, the second skin 196 of the honeycomb material 184 and into the honeycomb interior 202 of the honeycomb material 184, such that the head portion 112 of the back side sleeve 102 is positioned within the counterbore 214 and the head portion 112 is flush with the inner surface 204 of the first workpiece 186. The back side sleeve 102 is easily inserted into the hole 212 as the outer diameter D2 of the sleeve portion 114 of the back side sleeve 102 is smaller than the diameter of the hole 212.

The stem member 106, with the internal locking collar 108 positioned thereon, is positioned within the front side sleeve 104 by inserting the third portion 166 of the elongated shank 158 of the stem member 106 through the third portion 148 of the aperture 140 of the front side sleeve 104. As the diameter D10 of the enlarged stem head 154 is larger than the diameter D9 of the third portion 148 of the aperture 140, the enlarged stem head 154 does not extend within the aperture 140 of the front side sleeve 104, but rather abuts against the second end 128 of the front side sleeve 104. Thus, the first portion 160 of the elongated shank 158, having a diameter D11, is positioned within the third portion 148 of the aperture 140, having a diameter D9. The second portion 162 of the elongated shank 158, having a diameter D12, is positioned within both the third portion 148 of the aperture 140 and the second portion 146 of the aperture 140, having a diameter D8. The internal locking collar 108 positioned on the third portion 166 of the elongated shank 158 is positioned within the second portion 146 of the aperture 140. The third portion 166 of the elongated shank 158, having a diameter D13, is positioned within the second portion 146 of the aperture 140, the first portion 144 of the aperture 140, and extends beyond the head portion 122 of the front side sleeve 104.

The combination of the front side sleeve 104 and the stem member 106 is positioned within the hole 212 after the back side sleeve 102 is positioned within the hole 212, as described above, by inserting the enlarged stem head 154 of the stem member 106 and the sleeve portion 124 of the front side sleeve 104 into the hole 212 through the second workpiece 188, the first skin 190 of the honeycomb material 184 and into the honeycomb interior 202 of the honeycomb material 184, such that the head portion 122 of the front side sleeve 104 is positioned within the counterbore 216 and the head portion 122 is flush with the outer surface 210 of the second workpiece 188, and such that the enlarged stem head 154 of the stem member 106 and a portion of the second portion 138 of the sleeve portion 124 of the front side sleeve 104 are positioned within the aperture 120 of the sleeve portion 114 of the back side sleeve 102. The configuration of the front side sleeve 104 allows the front side sleeve 104 to accommodate the uniform diameter hole 212. The sleeve portion 124 of the front side sleeve 104 is tapered between the first and second portions 132, 138 thereof to allow the second portion 138 thereof to be inserted into the aperture 120 of the sleeve portion 114 of the back side sleeve 102. A gap 218 is formed between the sleeve portion 114 of the back side sleeve 102 and the enlarged stem head 154 of the stem member 106. The gap 218 is necessary for the expansion of the front and back side sleeves 104, 102 due to the installation, which is easily satisfied in a honeycomb structure.

The driving anvil 110 is placed around the third portion 166 of the elongated shank 158 to abut against the first end 126 of the front side sleeve 104.

After the honeycomb rivet 100 is positioned within the hole 212, the conventional pull type tool 178 is positioned around the third portion 166 of the elongated shank 158 such that an end thereof abuts against the driving anvil 110, as illustrated in FIG. 4, and applies a firm, steady pressure to the driving anvil 110 to seat the head portion 122 of the front side sleeve 104 within the counterbore 216 of the hole 212. The driving anvil 110 eliminates wear and replacement of expendable pull tool components, considerably extending the life of the pull tool 178.

Figure 5:
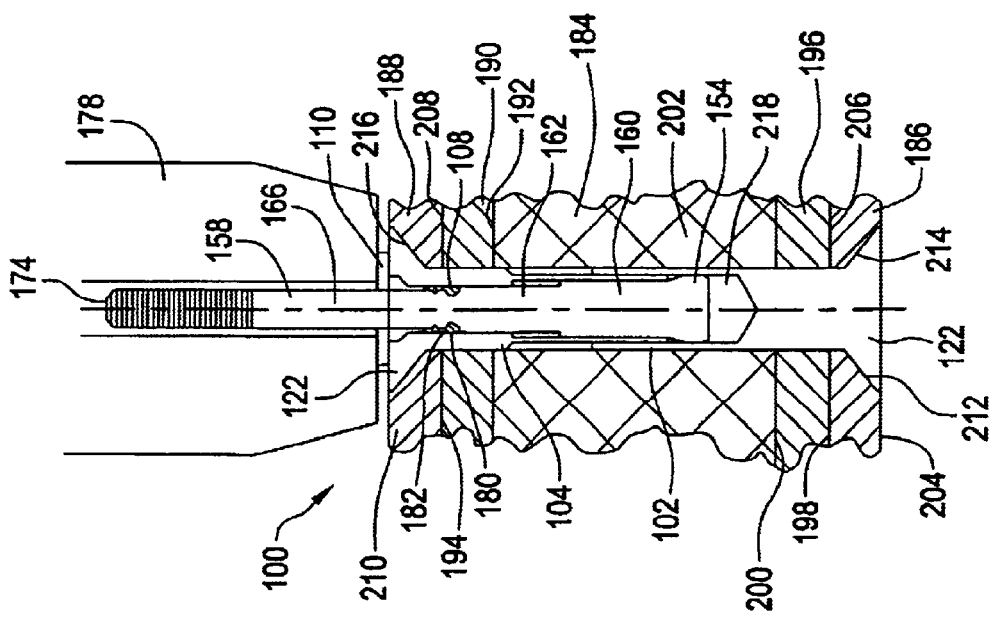

As illustrated in FIG. 5, the pull type tool 178 applies a downward compressive force F1 on the driving anvil 110 in order to hold both the back and front side sleeves 102, 104 in place, while at the same time applying an upward tensile force F2 to the pulling portion 172 of the elongated shank 158 of the stem member 106. The force F2 causes the enlarged stem head 154 to upset the second portion 138 of the sleeve portion 124 of the front side sleeve 104, proximate to the second end 128 of the front side sleeve 104, which in turn upsets the sleeve portion 114 of the back side sleeve 102, proximate to the second end 118 of the back side sleeve 102. The upsetting of the sleeve portions 124, 114 of the front and back side sleeves 104, 102, respectively, causes the front and back side sleeves 104, 102 to lock together and to fasten the joint of the honeycomb rivet 100 within the honeycomb material 184.

As illustrated in FIG. 6, as the pull tool 178 continues to apply the force F2 to the pulling portion 172 of the elongated shank 158 of the stem member 106, the lock sleeve portion 182 of the internal locking collar 108 comes into contact with the driving anvil 110, forcing the lock sleeve portion 182 of the internal locking collar 108 to deform and fill into the first portion 144 of the aperture 140 of the front side sleeve 104. The deformation of the internal locking collar 108 into the first portion 144 of the aperture 140 of the front side sleeve 104 securely locks the stem member 106 and the front side sleeve 104 together. The internal locking collar 108 enhances joint integrity and reliability, and is visible after installation. The internal locking collar 108 also prevents the stem member 106 from rattling and, as it is held in place, further helps insure shear load across the honeycomb rivet 100.

Continued application of the force F2 by the pull tool 178 causes the elongated shank 158 of the stem member 106 to fracture at the break notch 179, providing a flush, burr-free installation, as illustrated in FIG. 7.

Attention is now directed to the second embodiment of the honeycomb rivet 300 as illustrated in FIGS. 8–11. The honeycomb rivet 300 of the second embodiment includes a back side sleeve 302, a front side sleeve 304, a stem member 306, an external locking collar 309, and a shifting washer 311.

The back side sleeve 302, the front side sleeve 304 and the stem member 306 of the honeycomb rivet 300 are identical to the back side sleeve 102, the front side sleeve 104 and the stem member 106 of the honeycomb rivet 100 and, therefore, the description of these items will not be repeated. Similarly, the honeycomb material 384 and workpieces 386, 388 are identical to the honeycomb material 184 and workpieces 186, 188 and, therefore, the description thereof will not be repeated.

Figure 8:
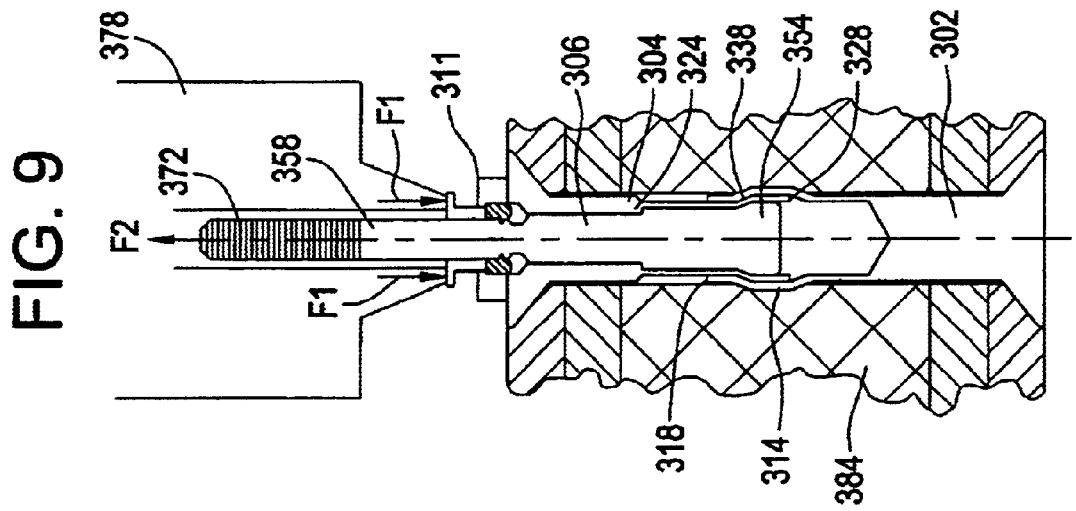

As best illustrated in FIG. 8, the external locking collar 309 has an annular cylindrical shape and is used for the setting or locking of the honeycomb rivet 300. The external locking collar 309 is positioned around the third portion 366 of the elongated shank 306 between the break neck 379 and the pulling portion 372. The external locking collar 309 has an inner diameter which is slightly larger than diameter D13 of the third portion 366 of the elongated shank 306, and an outer diameter which is larger than the inner diameter thereof and is slightly smaller than diameter D7 of the first portion 344 of the aperture 340 within the front side sleeve 304. The external locking collar 309 is preferably formed of a cold deformable material such as precipitation-hardening stainless steel, for instance A-286, or alloys containing nickel, chromium and iron, better known as INCONEL®— manufactured by Inco Alloys International, Inc.

As best illustrated in FIG. 8, the shifting washer 311 has an upper washer element 420 and a lower washer element 422 which are concentrically arranged but axially offset from each other as shown in the drawings. A shear section 424 is employed in joining together the upper washer element 420 and the lower washer element 422 as shown in the drawings. As will hereinafter become more apparent, the upper washer element 420 is of such size as to freely slidably fit within the internal dimension or configuration of the lower washer element 422 upon shear or failure of the shear section 424.

An operation of utilizing the honeycomb rivet 300 to attach the honeycomb material 384 between the first and second workpieces 386, 388 will now be discussed with relation to FIGS. 8–11.

A hole 412 of uniform diameter is drilled through the first workpiece 386, the honeycomb material 384 and the second workpiece 388, which uniform diameter is slightly larger than the diameter D2 of the sleeve portion 314 of the back side sleeve 302 and the diameter D6 of the second portion 338 of the sleeve portion 324 of the front side sleeve 304. Counterbores 414, 416 are also formed in the hole 412 in both the first and second workpieces 386, 388, respectively. Counterbore 416 is of a size to accommodate the head portion 322 of the front side sleeve 304 while counterbore 414 is of a size to accommodate the head portion 312 of the back side sleeve 302. The drilling of the uniform diameter hole 412 provides for a time saving as it avoids the need for changing of drill bit sizes to drill different size holes, as done in the prior art, or for the need for more than one tool.

After the hole 414 and counterbores 414, 416 are formed within the honeycomb material 384 and the workpieces 386, 388, the honeycomb rivet 300 is positioned within the hole 412 and the counterbores 414, 416.

The back side sleeve 302 is positioned within the hole 412 by inserting the sleeve portion 314 thereof into the hole 412 through the first workpiece 386, the second skin 396 of the honeycomb material 384 and into the honeycomb interior 402 of the honeycomb material 384, such that the head portion 312 of the back side sleeve 302 is positioned within the counterbore 414 and the head portion 312 is flush with the inner surface 304 of the first workpiece 386. The back side sleeve 302 is easily inserted into the hole 412 as the outer diameter D2 of the sleeve portion 314 of the back side sleeve 302 is smaller than the diameter of the hole 412.

The stem member 306 is positioned within the front side sleeve 304 by inserting the third portion 366 of the elongated shank 358 of the stem member 306 through the third portion 348 of the aperture 340 of the front side sleeve 304. As the diameter D10 of the enlarged stem head 354 is larger than the diameter D9 of the third portion 348 of the aperture 340, the enlarged stem head 354 does not extend within the aperture 340 of the front side sleeve 304, but rather abuts against the second end 328 of the front side sleeve 304. Thus, the first portion 360 of the elongated shank 358, having a diameter D11, is positioned within the third portion 348 of the aperture 340, having a diameter D9. The second portion 362 of the elongated shank 358, having a diameter D12, is positioned within both the third portion 348 of the aperture 340 and the second portion 346 of the aperture 340, having a diameter D8. The third portion 366 of the elongated shank 358, having a diameter D13, is positioned within the second portion 346 of the aperture 340, the first portion 344 of the aperture 340, and extends beyond the head portion 322 of the front side sleeve 304.

The combination of the front side sleeve 304 and the stem member 306 is positioned within the hole 412 after the back side sleeve 302 is positioned within the hole 412, as described above, by inserting the enlarged stem head 354 of the stem member 306 and the sleeve portion 324 of the front side sleeve 304 into the hole 412 through the second workpiece 388, the first skin 390 of the honeycomb material 384 and into the honeycomb interior 402 of the honeycomb material 384, such that the head portion 322 of the front side sleeve 304 is positioned within the counterbore 416 and the head portion 322 is flush with the outer surface 410 of the second workpiece 388, and such that the enlarged stem head 354 of the stem member 306 and a portion of the second portion 338 of the sleeve portion 324 of the front side sleeve 304 are positioned within the aperture 320 of the sleeve portion 314 of the back side sleeve 302. The configuration of the front side sleeve 304 allows the front side sleeve 304 to accommodate the uniform diameter hole 412. The sleeve portion 324 of the front side sleeve 304 is tapered between the first and second portions 332, 338 thereof to allow the second portion 338 thereof to be inserted into the aperture 320 of the sleeve portion 314 of the back side sleeve 302. A gap 418 is formed between the sleeve portion 314 of the back side sleeve 302 and the enlarged stem head 354 of the stem member 306. The gap 418 is necessary for the expansion of the front and back side sleeves 304, 302 due to the installation, which is easily satisfied in a honeycomb structure.

The external locking collar 308 is placed around the third portion 366 of the elongated shank 358 such that the external locking collar 308 is positioned proximate to, or partially within, the first portion 344 of the aperture 340 of the front side sleeve 304.

The shifting washer 310 is positioned around the third portion 366 of the elongated shank 358 such that a bottom surface 426 of the lower washer element 422 abuts against the first end 326 of the front side sleeve 304, and a bottom surface 428 of the upper washer element 420 abuts against the external locking collar 308.

After the honeycomb rivet 300 is positioned with the hole 412, the conventional pull type tool 378 is positioned around the third portion 366 of the elongated shank 358 such that an end thereof abuts against a top surface 430 of the upper washer element 420 of the shifting washer 311, as illustrated in FIG. 8, and applies a firm, steady pressure to the shifting washer 311 to seat the head portion 322 of the front side sleeve 304 within the counterbore 416 of the hole 412. The shifting washer 311 eliminates wear and replacement of expendable pull tool components, considerably extending the life of the pull tool 378, as well as performing another function as will be described herein.

Figure 9:
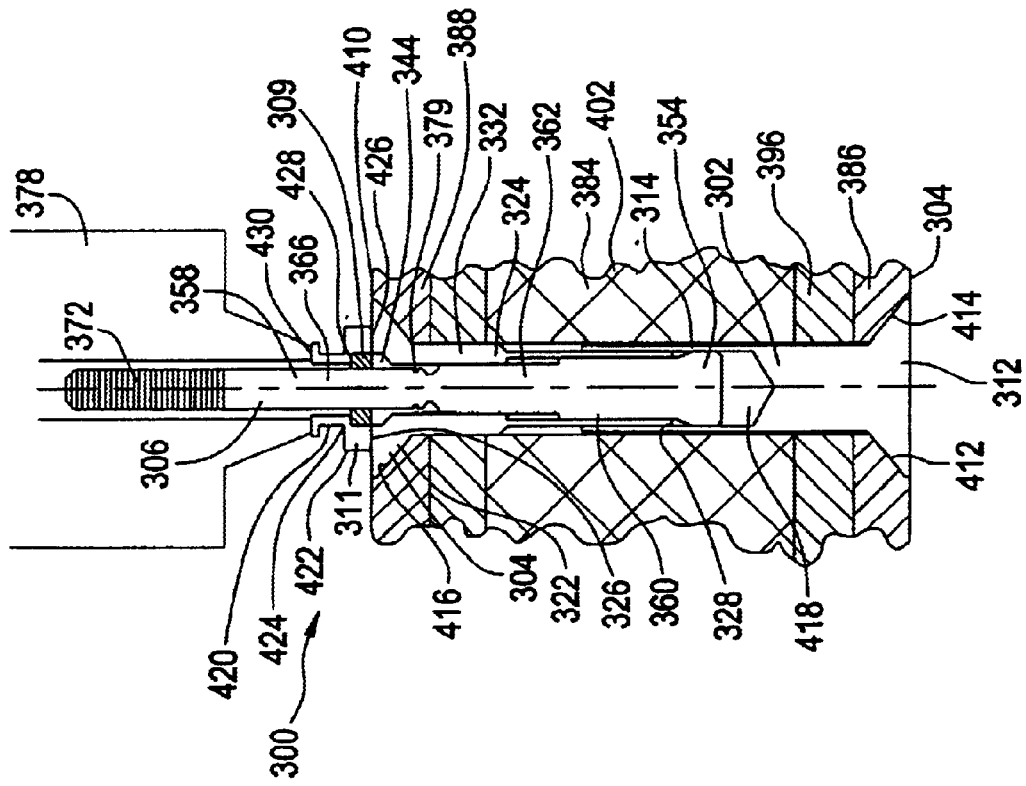

As illustrated in FIG. 9, the pull type tool 378 applies a downward compressive force F1 on the shifting washer 311 in order to hold both the back and front side sleeves 302, 304 in place, while at the same time applying an upward tensile force F2 to the pulling portion 372 of the elongated shank 358 of the stem member 306. The force F2 causes the enlarged stem head 354 to upset the second portion 338 of the sleeve portion 324 of the front side sleeve 304, proximate to the second end 328 of the front side sleeve 304, which in turn upsets the sleeve portion 314 of the back side sleeve 302, proximate to the second end 318 of the back side sleeve 302. The upsetting of the sleeve portions 324, 314 of the front and back side sleeves 304, 302, respectively, causes the front and back side sleeves 304, 302 to lock together and to fasten the joint of the honeycomb rivet 300 within the honeycomb material 384.

As illustrated in FIG. 10, as the pull tool 378 continues to apply the force F1 to the upper washer element 420 of the shifting washer 311, the force F1 overcomes the shear strength of the shear section 424 causing the upper washer section 420 to shear from the lower washer section 422. As the upper washer section 420 is sheared from the lower washer section 422, and as the pull tool 378 is applying the force F1 to the upper washer element 420, the upper washer element 420 is forced downwardly into the external locking collar 309. The external locking collar 309 is thus forced to deform into the first portion 344 of the aperture 340 of the front side sleeve 304 and into the annular lock groove 370 of the stem member 306. The deformation of the external locking collar 309 into the first portion 344 of the aperture 340 of the front side sleeve 304 and into the annular lock groove 370 of the stem member 306 securely locks the stem member 306 and the front side sleeve 304 together. The external locking collar 308 enhances joint integrity and reliability, and is visible after installation. The external locking collar 308 also prevents the stem member 306 from rattling and, as it is held in place, further helps insure shear load across the honeycomb rivet 300.

Continued application of the force F2 by the pull tool 378 causes the elongated shank 358 of the stem member 306 to fracture at the break notch 379, providing a flush, burr-free installation, as illustrated in FIG. 11.

Further, as the shifting washer 311 collapses into itself, a solid washer is left that is easily retrieved and removed.

Thus, the honeycomb rivets 100, 300 of the embodiments of the present invention provide a rivet for fastening honeycomb materials to other materials which is quick and easy to install in comparison to other fasteners currently used for the same purpose.

While preferred embodiments of the invention are shown and described, it is envisioned that those skilled in the art may devise various modifications without departing from the spirit and scope of the foregoing description and the appended claims.

The invention is claimed as follows:

1. A fastener for attaching honeycomb material to a workpiece, the honeycomb material and the workpiece defining a hole, said fastener comprising:
   a back side sleeve adapted for insertion in the hole, said back side sleeve having an aperture extending at least partially therethrough;
   a front side sleeve adapted for insertion in the hole, said front side sleeve having an aperture extending entirely therethrough, at least a portion of said front side sleeve configured such that said portion is positionable within said aperture of said back side sleeve; and
   a stem member having a stem head and a shank extending therefrom, said shank being positioned within said aperture of said front side sleeve, said stem head being positioned within said aperture of said back side sleeve, said stem member configured such that said stem head expands said front side sleeve upon said stem head being pulled into said aperture of said front side sleeve, said expansion of said front side sleeve causing expansion of said back side sleeve such that said front and back side sleeves lock together and attach said fastener to the honeycomb material and the workpiece.

2. A fastener as defined in claim 1, wherein said back side sleeve has a head at a first end thereof and a sleeve portion which extends from said head to a second end thereof, said head of said back side sleeve being configured such that said head is incapable of passing through the hole, said aperture of said back side sleeve extending from said second end of said back side sleeve toward said first end of said back side sleeve, and wherein said front side sleeve has a head at a first end thereof and a sleeve portion which extends from said head to a second end thereof, said head of said front side sleeve being configured such that said head is incapable of passing through the hole, at least a portion of said sleeve portion of said front side sleeve configured such that said portion is positionable within said aperture of said sleeve portion of said back side sleeve.

3. A fastener as defined in claim 2, further including means for locking said stem to said front side sleeve.

4. A fastener as defined in claim 3, wherein said locking means includes a locking collar positioned between a lock groove provided in said stem and said sleeve portion of said front side sleeve, said locking means further including a driving anvil positioned around said stem, said driving anvil configured such that said driving anvil blocks movement of said locking collar such that said locking collar deforms within said lock groove and said aperture of said front side sleeve when said locking collar contacts said driving anvil upon said aperture of said front side sleeve upon said stem head being pulled into said aperture of said front side sleeve, said deformation of said locking collar locks said stem to said front side sleeve.

5. A fastener as defined in claim 4, wherein a diameter of said aperture of said front side sleeve is larger within said head thereof than a diameter of said aperture of said front side sleeve within said sleeve portion thereof such that said locking collar is capable of deforming into said aperture of said front side sleeve.

6. A fastener as defined in claim 4, said stem is provided with a weakened part with spacing between said weakened part and said stem head being within a grip length of the fastener whereby said stem is configured such that said weakened part breaks when the deforming of said locking collar stops the movement of said stem.

7. A fastener as defined in claim 6, wherein said weakened part is a break groove spaced from said locking groove, said locking collar fitting slidably in said front side sleeve and overlapping said break groove.

8. A fastener as defined in claim 4, wherein said stem is configured such that said stem is grippable by a setting tool to receive a tensile force as a reaction to a compressive force is applied to said driving anvil.

9. A fastener for attaching honeycomb material to a workpiece, the honeycomb material and the workpiece defining a hole, said fastener comprising:
  a back side sleeve adapted for insertion in the hole, said back side sleeve having an aperture extending at least partially therethrough, said back side sleeve has a head at a first end thereof and a sleeve portion which extends from said head to a second end thereof, said head of said back side sleeve being configured such that said head is incapable of passing through the hole, said aperture of said back side sleeve extending from said second end of said back side sleeve toward said first end of said back side sleeve;
  a front side sleeve adapted for insertion in the hole, said front side sleeve having an aperture extending entirely therethrough, at least a portion of said front side sleeve configured such that said portion is positionable within said aperture of said back side sleeve, said front side sleeve has a head at a first end thereof and a sleeve portion which extends from said head to a second end thereof, said head of said front side sleeve being configured such that said head is incapable of passing through the hole, at least a portion of said sleeve portion of said front side sleeve configured such that said portion is positionable within said aperture of said sleeve portion of said back side sleeve;
  a stem member having a stem head and a shank extending therefrom, said shank being positioned within said aperture of said front side sleeve, said stem head being positioned within said aperture of said back side sleeve, said stem member configured such that said stem head expands said front side sleeve upon said stem head being pulled into said aperture of said front side sleeve, said expansion of said front side sleeve causing expansion of said back side sleeve such that said front and back side sleeves lock together and attach said fastener to the honeycomb material and the workpiece; and
  means for locking said stem to said front side sleeve, said locking means includes a shifting washer having a first washer element and a second washer element, said washer elements being concentrically arranged but axially offset from each other, said washer elements being joined together by a shear section, said first washer element being of a size so as to freely slidably fit within an internal dimension of said second washer element upon shear of said shear section, and a locking collar initially separate from both said washer elements and from said second sleeve underlying said second washer element and being engageable by said second washer element as a result of and upon said breakaway portion responding to said maximum force to be forced by said radially inner element into cooperating means on said stem and said front side sleeve to lock said stem and said front side sleeve in their respective positions.

10. A fastener as defined in claim 9, wherein a diameter of said aperture of said front side sleeve is larger within said head thereof than a diameter of said aperture of said front side sleeve within said sleeve portion thereof such that said locking collar is configured to deform into said aperture of said front side sleeve.

11. A fastener as defined in claim 9, said stem is provided with a weakened part with spacing between said weakened part and said stem head being within the grip length of the fastener whereby said stem is configured such that said weakened part breaks when the deforming of said locking collar stops the movement of said stem.

12. A fastener as defined in claim 11, wherein said weakened part is a break groove spaced from said locking groove, said locking collar fitting slidably in said front side sleeve and overlapping said break groove.

13. A fastener as defined in claim 9, wherein said stem is adapted to be gripped by a setting tool to receive a tensile force as a reaction to a compressive force is applied to said shifting washer.

14. A fastener comprising:
  a back side sleeve having a head at one end and an expandable sleeve portion at an opposite end, said expandable sleeve portion having an aperture therein;
  a front side sleeve having a head portion at one end and a sleeve portion at an opposite end, said sleeve portion of said front side sleeve configured to be positionable within said aperture of said sleeve portion of said back side sleeve, said front side sleeve having an aperture extending therethrough;
  a stem member having,
    a head portion at an end thereof, said head portion configured to be positionable within said aperture of said back side sleeve, said head portion further being configured to be pulled into said aperture of said front side sleeve such that said sleeve portion of said front side sleeve is expanded, said expansion of said front side sleeve in turn expands said sleeve portion of said back side sleeve such that said back side sleeve and said front side sleeve are joined together,
    a shank extending from said head portion to an opposite end thereof, said shank configured to be substantially positionable within said aperture of said front side sleeve, said shank having a pulling portion at said opposite end which is adapted to be engaged by a tool for pulling said stem member.

15. A fastener as defined in claim 14, further including means for locking said stem to said front side sleeve.

16. In combination:
  honeycomb material having a first honeycomb skin having inner and outer surfaces, a second honeycomb skin having inner and outer surfaces, and a honeycomb interior provided between said inner surfaces of said first and second honeycomb skins, said honeycomb material having an aperture therethrough;
  a first workpiece positioned against said outer surface of said first honeycomb skin, said first workpiece having an aperture therethrough which is in alignment with said aperture of said honeycomb material;
  a second workpiece positioned against said outer surface of said second honeycomb skin, said second workpiece having an aperture therethrough which is in alignment with said aperture of said honeycomb material; and
  a fastener having,
    a back side sleeve positioned within said aperture of said first workpiece and at least partially positioned within said aperture of said honeycomb material, said back side sleeve having an aperture extending partially therethrough, at least a portion of said back side sleeve being radially expanded in said aperture of said honeycomb material to in that manner firmly secure said back side sleeve to said honeycomb material; and a front side sleeve positioned within said aperture of said second workpiece and at least partially positioned within said apertures of said honeycomb material and said back side sleeve, said front side sleeve having an aperture extending therethrough, at least a portion of said front side sleeve being radially expanded in said aperture of said back side sleeve to in that manner firmly secure said front side sleeve to said back side sleeve.

17. The combination of claim 16, wherein said fastener further includes a stem member and means for locking said stem member to said front side sleeve, said stem member having a head portion and a shank portion extending therefrom, said head portion being positioned within said aperture of said front side sleeve proximate to said radially expanded portion of said front side sleeve.

18. The combination of claim 17, wherein said first and second workpieces have counterbores provided therein which are in communication with said apertures of said first and second workpieces, and wherein said front and back side sleeves have head portions, said head portion of said back side sleeve being positioned within said counterbore of said first workpiece, said head portion of said front side sleeve being positioned within said counterbore of said second workpiece.

19. The combination of claim 18, wherein said locking means is provided between said head portion of said front side sleeve and said shank portion of said stem member.

20. A method of attaching first and second workpieces to honeycomb material, the honeycomb material having a first honeycomb skin, a second honeycomb skin, and a honeycomb interior therebetween, said honeycomb material having an aperture therethrough, the first workpiece having an aperture therethrough, the second workpiece having an aperture therethrough, the method comprising the steps of:

a) positioning the first workpiece against the first honeycomb skin to align the apertures of the first workpiece and the honeycomb material;

b) positioning the second workpiece against the second honeycomb skin to align the apertures of the second workpiece and the honeycomb material;

c) inserting a back side sleeve through the aperture of the first workpiece and into the aperture of the honeycomb material, the back side sleeve having an aperture extending at least partially therethrough;

d) inserting a stem member through an aperture of a front side sleeve, the aperture of the front side sleeve extending entirely therethrough, the stem member having a head portion and an shank extending therefrom, the head portion being positioned outside of the aperture of the front side sleeve;

e) inserting the front side sleeve through the aperture of the second workpiece, into the aperture of the honeycomb material, and into the aperture of the back side sleeve such that the head portion of the stem member is positioned within the aperture of the back side sleeve;

f) pulling the shank portion of the stem member such that the head portion of the stem member enters the aperture of the front side sleeve and expands the front side sleeve and, thus, the back side sleeve, such that the front and back side sleeves are attached together, and such that the back side sleeve and the honeycomb material are attached together; and g) locking the front side sleeve and the elongated shank portion of the stem member together.

* * * * *

UNITED STATES PATENT AND TRADEMARK OFFICE
CERTIFICATE OF CORRECTION

PATENT NO.   : 6,898,918 B2
DATED        : May 31, 2005
INVENTOR(S)  : Soheil Eshraghi Page 1 of 1

It is certified that error appears in the above-identified patent and that said Letters Patent is hereby corrected as shown below:

<u>Column 10,</u>
Line 14, "withen" should be -- within --

Signed and Sealed this

Nineteenth Day of July, 2005

JON W. DUDAS
*Director of the United States Patent and Trademark Office*